United States Patent [19]

Usui et al.

[11] Patent Number: 4,980,960
[45] Date of Patent: Jan. 1, 1991

[54] METHOD OF FIXING A PIPE BY MEANS OF A CLAMP BODY

[75] Inventors: Masayoshi Usui, Mumazu; Kazunori Takikawa, Numazu, both of Japan

[73] Assignee: USUI Kokusai Sangyo Kaisha Ltd., Japan

[21] Appl. No.: 415,022

[22] Filed: Sep. 29, 1989

[30] Foreign Application Priority Data

Oct. 20, 1988 [JP] Japan .................................... 264955
Oct. 29, 1988 [JP] Japan .................................... 274218

[51] Int. Cl.$^5$ ............................................. B23P 11/02
[52] U.S. Cl. .................................... 29/447; 29/577.1
[58] Field of Search ............... 285/381; 29/447, 527.1; 403/273

[56] References Cited

U.S. PATENT DOCUMENTS

| | | | |
|---|---|---|---|
| 2,971,425 | 2/1961 | Blakeley | 411/55 X |
| 3,388,931 | 6/1968 | Johnson et al. | 29/447 X |
| 3,518,359 | 6/1970 | Trimble et al. | 29/447 X |
| 3,803,700 | 4/1974 | Tischlinger | 29/447 |
| 4,126,498 | 11/1978 | Donecker | 29/447 X |

Primary Examiner—Timothy V. Eley
Attorney, Agent, or Firm—Anthony C. Casella; Gerald E. Hespos

[57] ABSTRACT

Disclosed is a method of fixing a pipe by means of a clamp body. A bent wall is formed by being provided integrally with a tabular clamp member in such a manner as to project from at least one portion of a pipe assembly hole bored in the tabular clamp member having a fixing portion or by allowing a separately formed cylindrical member of a short length to be inserted and fitted in the assembly hole and secured to the clamp member. In an engagingly secured state in which the pipe is inserted in the assembly hole, the projecting wall and a portion of the pipe in the vicinity of the projecting wall are clad with a heat shrinkable cylindrical piece of a short length such as an irreversible shape memory alloy or a heat shrinkable resin, and the fixing of the pipe is effected by subjecting the cylindrical piece to heat shrinkage by heating. A plurality of the bent walls constituting projecting walls may be provided at intervals, or the bent wall may be provided on each side of the clamp member. In cases where the projecting wall is formed by the cylindrical member, the cylindrical wall of the cylindrical member may be provided with a plurality of axial slits, or the cylindrical member may be provided with a collar wall projecting outwardly of its end or a substantially intermediate portion thereof.

12 Claims, 3 Drawing Sheets

PRIOR ART

METHOD OF FIXING A PIPE BY MEANS OF A CLAMP BODY

BACKGROUND OF THE INVENTION

1. Field of the Invention

The present invention relates to a method of fixing by means of a clamp body a metal pipe or a resin tube (hereinafter collectively referred to as the pipe) having a relatively small diameter of about 30 mm or less and laid as a supply line for supplying oil or gas in automobiles in general or various types of machine and equipment.

2. Description of the Related Art

As a conventional fixing method of this type, as shown in FIG. 13, in a state in which a pipe P' is passed through an assembly hole 12 provided in a clamp member 11, in the case of a metal pipe, the pipe P' and the clamp member 11 are welded together at a weld W by means of soldering over a peripheral portion of the hole 12 so as to be fixed, while, in the case of a resin tube, the tube is clamped by a clip wall portion (not shown) so as to be fixed.

However, with this conventional fixing method, in the case of the former case, there have been drawbacks in that a troublesome operation is involved due to the heating and solder welding by using a burner, frequently causing a deterioration in the mechanical strength of the pipe in the vicinity of the weld due to a local overheating, resulting in fractures and breakage, and that productivity is aggravated remarkably since plating is necessitated for corrosion prevention or the like after the solder welding. Meanwhile, in the latter case, there has also been a drawback in that the pipe is displaced in an axial or circumferential direction due to faulty clamping, possibly causing the pipe to be separated and come off the clip wall portion when subjected to vibrations.

SUMMARY OF THE INVENTION

Accordingly, an object of the present invention is to provide a method of fixing a pipe by means of a clamp body which is capable of preventing a deterioration in the mechanical strength of a fixed portion or an adjacent portion thereof and improving productivity by eliminating a troublesome operation involved in fixing the pipe and by permitting the use of a clamp member and a pipe that have already been plated so as to eliminate plating after the fixing.

Another object of the invention is to provide a method of fixing a pipe by means of a clamp body which permits the pipe to be fixed at a fixed angle relative to a clamp member, as desired, prevents the axial or circumferential displacement of the pipe through positive fixing, and is free of coming off the clamp member through fixed engagement of the pipe through an assembly hole provided in the clamp member.

To these ends, in accordance with the present invention, there is provided a method of fixing a pipe by means of a clamp body wherein a bent wall is formed by being provided integrally with a tabular clamp member in such a manner as to project from at least one portion of a pipe assembly hole bored in the tabular clamp member having a fixing portion or by allowing a separately formed cylindrical member of a short length to be inserted and fitted in the assembly hole and secured to the clamp member. In an engagingly secured state in which the pipe is inserted in the assembly hole, the projecting wall and a portion of the pipe in the vicinity of the projecting wall are clad with a heat shrinkable cylindrical piece of a short length such as an irreversible shape memory alloy or a heat shrinkable resin, and the fixing of the pipe is effected by subjecting the cylindrical piece to heat shrinkage by heating. A plurality of the bent walls constituting projecting walls may be provided at intervals, or the bent wall may be provided on each side of the clamp member.

In cases where the projecting wall is formed by the cylindrical member, the cylindrical wall of the cylindrical member may be provided with a plurality of axial slits, or the cylindrical member may be provided with a collar wall projecting outwardly of its end or a substantially intermediate portion thereof.

In accordance with the present invention, it is readily possible to obtain a fixing structure by causing the cylindrical member to undergo heat shrinkage on heating at a relatively low temperature, the cylindrical member being clad on the projecting wall formed around the peripheral portion of the assembly hole and a portion of the pipe in the vicinity of the projecting wall. Accordingly, the troublesome fixing operation conventionally experienced can be alleviated. At the same time, the fixed portion or portions adjacent thereto are free from deterioration in mechanical strength, while productivity is improved since components provided with plating processing can be used. In addition, the pipe can be fixed to the clamp member at a desired angle, and it is possible to prevent the axial or circumferential displacement of the pipe and the possible coming off of the pipe from the fixing portion, thereby effecting the fixing positively.

The above and other objects, features and advantages of the invention will become more apparent from the following detailed description of the invention when read in conjunction with the accompanying drawings.

DESCRIPTION OF THE PREFERRED EMBODIMENTS

Referring now to accompanying drawings, a description will be given of the preferred embodiment of the present invention.

Figure 1:
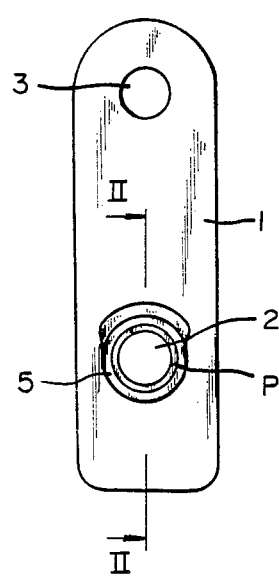
FIG. 1 is a top plan view based on a method of fixing a pipe by means of a clamp body in accordance with an embodiment of the present invention.
Figure 2:
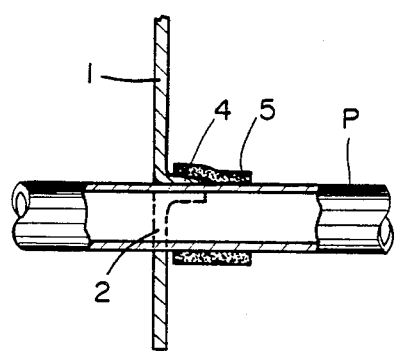
FIG. 2 is a cross-sectional view, partly in section, taken along the line II—II of FIG. 1.
Figure 3:
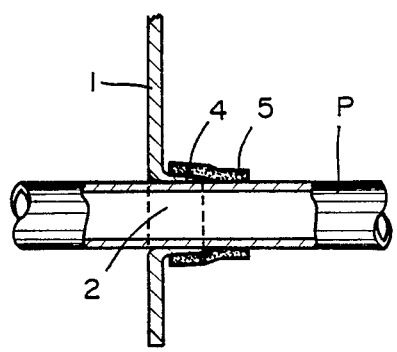
FIG. 3 is a view in accordance with another embodiment of the present invention, corresponding to FIG. 2.
Figure 4:
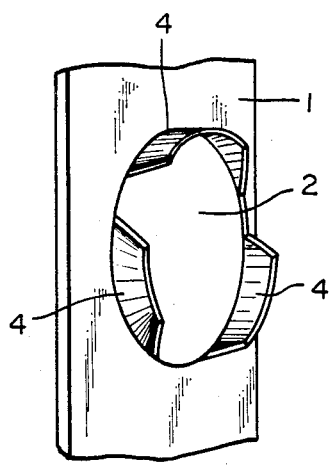
FIG. 4 is an enlarged partial diagram illustrating another example of a bent wall.
Figure 5:
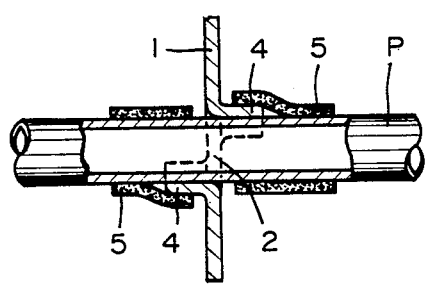
FIG. 5 is a diagram in accordance with still another example of the bent wall, corresponding to FIG. 2.
Figure 6:
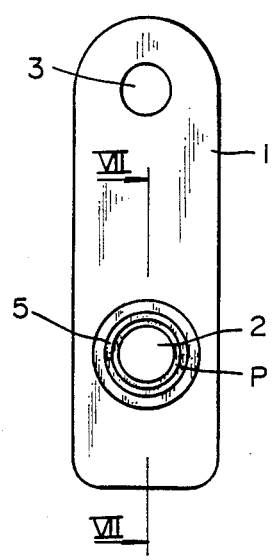
FIG. 6 is a top plan view based on a method of fixing a pipe by means of a clamp body in accordance with an another embodiment of the present invention.
Figure 7:
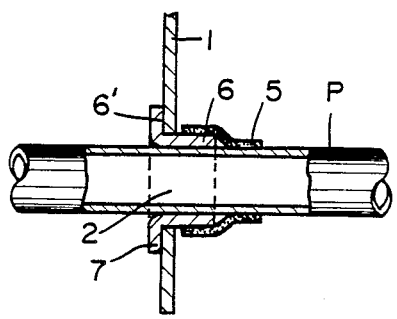
FIG. 7 is a cross-sectional view, partly in section, taken along the line VII—VII of FIG. 6.

Referring to FIGS. 1 to 5, a tabular clamp member 1 has a fixing hole 3 for fixing the clamp member 1 to a member to be fixed to by means of a bolt or the like. The clamp member 1 has a bent wall 4 integrally formed thereon in such a manner as to project from a part (see FIG. 2) or an entire periphery (see FIG. 3) of an assembly hole 2 bored in the clamp member 1 for assembling a pipe P thereto. It should be noted that a plurality of bent walls 4 may be provided as shown in FIG. 4, or the bent wall 4 may be provided in such a manner as to project from each side of the clamp member 1 as shown in FIG. 5.

A description will now be given with reference to FIGS. 6 to 12, in which components that are identical to those described in FIGS. 1 to 5 are denoted by the same reference numerals.

Figure 8:
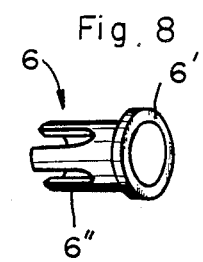
FIG. 8 is a perspective view of another example of a cylindrical member.
Figure 9:
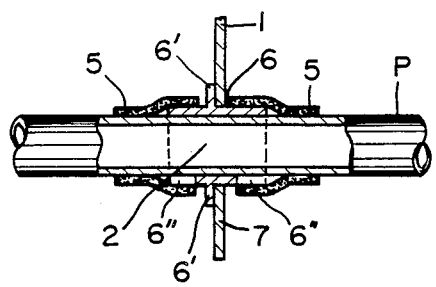
FIGS. 9 to 12 are diagrams illustrating further embodiments of the invention, respectively, corresponding to FIG. 2.
Figure 10:
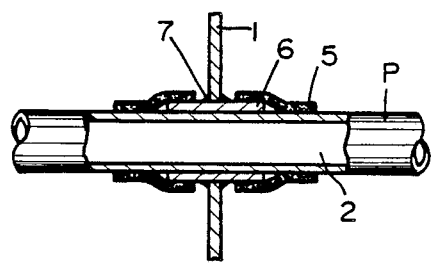
Figure 11:
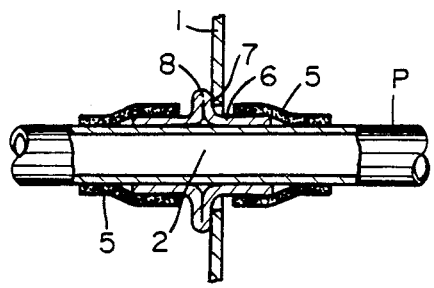
Figure 12:
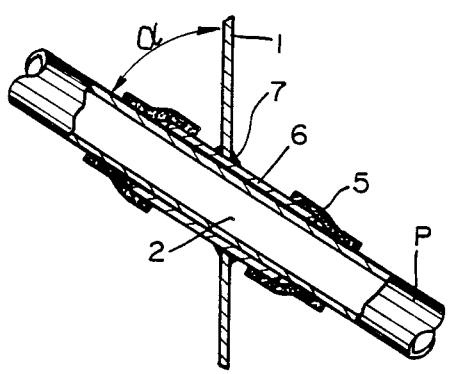
Figure 13:
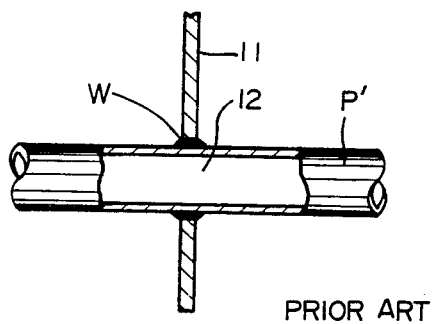
FIG. 13 is a vertical cross-sectional view, partly in section, in accordance with a conventional fixing method.

In FIGS. 6 to 12, the projecting wall is formed by using a cylindrical member instead of the above-described bent wall. That is, a cylindrical member 6 formed of a metal or resin and having a short length is inserted into the assembly hole 2 for fixing the pipe P. The cylindrical member 6 is then secured to the clamp member 1 at a portion 7 by means of soldering, pressure fitting, calking, spot welding or the like. In addition, as shown in FIG. 8, if a cylindrical wall of the cylindrical member 6 is provided with a plurality of axial slits 6", the fixing of the pipe P can be effected positively when a cylindrical piece 5, which will be described later, undergoes heat shrinkage. Furthermore, if the cylindrical member 6 is provided with a collar wall 6' extending outwardly of a peripheral portion thereof at its end or substantially intermediate portion, and if its cylindrical wall is made to project from one or two sides of the clamp member 1 and the collar wall 6' is fixed to the clamp member 1, the accuracy of an installation angle of the pipe relative to the clamp member is enhanced and, at the same time, the area of contact with the clamp member 1 increases, thereby improving vibration resistance and installation strength. At this time, the fabrication of the cylindrical member 4 is further facilitated if the metal pipe is cut into a short length and is fixed to the clamp member, as shown in FIG. 10, and if a substantially intermediate portion of the metal pipe is formed into a spool 8, as shown in FIG. 11, and is used as the collar wall 6'. Moreover, it is also possible to fix the pipe P to the clamp member at an arbitrary angle α such as an acute or obtuse angle, as shown in FIG. 12.

Subsequently, in an engagingly fixed state in which the pipe P is passed through the assembly hole 2, the belt wall 4 or the cylindrical wall of the cylindrical member 6 and a portion of the pipe P in the vicinity of the bent wall or the cylindrical wall are clad with the cylindrical piece 5 formed of an irreversible shape memory alloy such as a Ti-Ni alloy or a heat-shrinkable resin such as crosslinked polyolefin. In this state, the component members are subjected to heating by passing through a furnace preferably at a relatively low temperature of about 130° C. or less, thereby causing the cylindrical piece to heat shrink so as to effect fixing.

As described above, in accordance with the method of fixing a pipe by means of a clamp body, the bent wall 4 is provided projecting from the assembly hole 2 portion of the clamp member 1, or the cylindrical member 6 formed of a separate body is secured therein at the portion 7. The projecting wall of a desired length thus formed and a portion of the pipe P in the vicinity of the cylindrical member 6 are clad with the heat shrinkable cylindrical piece 5, and these members are secured to each other by heat shrinkage caused by heating. Accordingly, it is readily possible to obtain a fixed structure by heating at the aforementioned relatively low temperature, so that the troublesome fixing operation conventionally experienced can be alleviated. At the same time, the fixed portion or portions adjacent thereto are free from deterioration in mechanical strength, while productivity is improved since components provided with plating processing for corrosion prevention or the like can be used. In addition, the pipe can be fixed to the clamp member at a desired angle, and the axial or circumferential displacement of the pipe and the possible coming off of the pipe from the fixing portion are prevented through fixed engagement of the pipe through the assembly hole 2 provided in the clamp member. Thus, the method of fixing a pipe by means of a clamp body in accordance with the present invention is very useful.

What is claimed is:

1. A method of fixing a pipe by means of a clamp body, comprising the steps of:
   providing a pipe assembly hole in a tabular clamp body;
   forming at least one projecting wall on at least one side of said clamp body in such a manner as to project unitarily form a portion of said clamp body defining said assembly hole;
   clothing said unitary projecting wall and a portion of said pipe in the vicinity of said unitary projecting wall with a heat shrinkable cylindrical piece of a short length with said pipe passed through said assembly hole; and
   heat shrinking said cylindrical piece of heating.

2. A method according to claim 1, wherein said cylindrical member is formed of an irreversible shape memory alloy or a heat shrinkable resin.

3. A method according o claim 1, wherein the step of forming at least one projecting wall comprises forming a plurality of said projecting walls projecting unitarily from the tabular clamp body and disposed in spaced relationship to one another about the periphery of said assembly hole.

4. A method according to claim 1, wherein said step of forming at least one projecting wall comprises forming one projecting wall projecting unitarily from each side of said clamp body.

5. A method of fixing a pipe by means of a clamp body, comprising the steps of:
   providing a pipe assembly hole in a tabular clamp body;
   forming a projecting wall projecting form said clamp body by first providing a separately formed cylindrical member with a cylindrical wall having a plurality of axial slits, and then inserting and securing the cylindrical wall in said assembly hole of said clamp body to define the projecting wall;
   clothing said projecting wall and a portion of said pipe in the vicinity of said projecting wall with a heat shrinkable cylindrical piece of a short length with said pipe passed through said assembly hole; and
   heat shrinking said cylindrical piece by heating.

6. A method according to claim 5 wherein said cylindrical member is secured to said clamp body by means of soldering, pressure fitting, calking, or spot welding.

7. A method according to claim 5 wherein said cylindrical member has a projecting portion on an outer periphery thereof, said projecting portion secured to said clamp body.

8. A method according to claim 5, wherein said projecting portion is constituted by a collar wall.

9. A method of fixing a pipe by means of a clamp body, comprising the steps of:
   providing a pipe assembly hole in a tabular clamp body;
   forming a projecting wall by inserting a separately formed cylindrical member in said assembly hole so as to be in intimate contact with the periphery of said assembly hole and securing said cylindrical member to said clamp body;
   clothing said projecting wall and a portion of said pipe int he vicinity of said projecting wall with a heat shrinkable cylindrical piece of a short length with said pipe passed through said assembly hole; and
   heat shrinking said cylindrical piece by heating.

10. A method according to claim 9, wherein a plurality of axial slits are provided in a cylindrical wall of said cylindrical member.

11. A method according to claim 9, wherein said cylindrical member is secured to said clamp body by means of soldering, or spot welding.

12. A method according to claim 9, wherein said cylindrical member has a projecting portion on an outer periphery thereof, constituted by a collar, being in intimate contact with and secured to said clamp body.

* * * * *